July 28, 1925.
H. CROSS
SHOCK ABSORBER
Filed Nov. 10, 1922
1,547,367
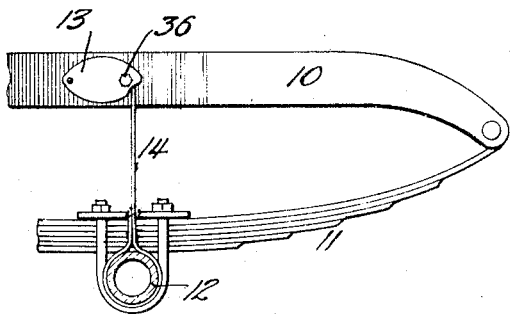
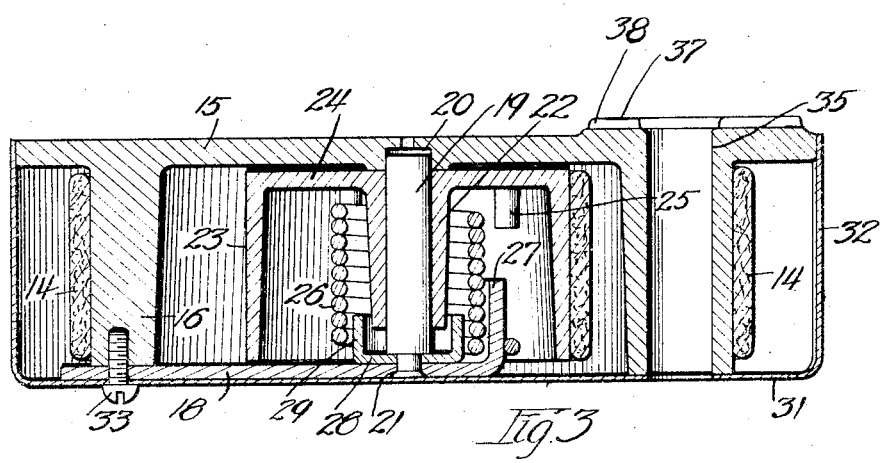
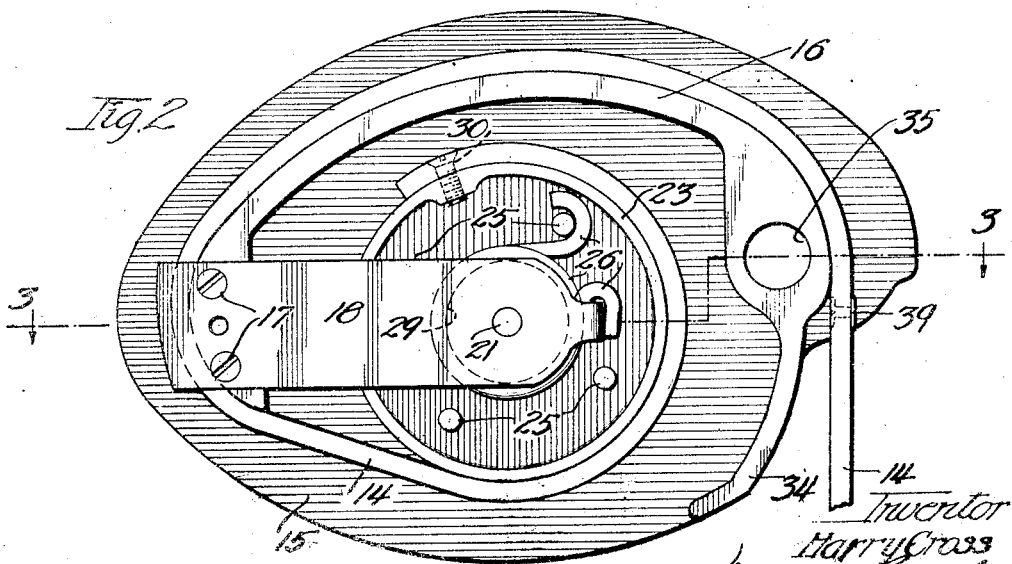
Inventor
Harry Cross Patented July 28, 1925.

1,547,367

UNITED STATES PATENT OFFICE.

HARRY CROSS, OF WOODSTOCK, ILLINOIS, ASSIGNOR TO CROSS MANUFACTURING COMPANY, OF WOODSTOCK, ILLINOIS, A CORPORATION OF ILLINOIS.

SHOCK ABSORBER.

Application filed November 10, 1922. Serial No. 599,960.

*To all whom it may concern:*

Be it known that I, HARRY CROSS, a citizen of the United States, and resident of Woodstock, in the county of McHenry and State of Illinois, have invented a certain new and useful Improvement in Shock Absorbers, of which the following is a full, clear, concise, and exact description, reference being had to the accompanying drawings, forming a part of this specification.

This invention relates to improvements in shock absorbers of the type in which a belt or strap is wound up upon compression of the vehicle spring and frictionally engages a braking surface to retard the retractile movement of the spring.

The present invention has for its object the provision of a device of this character which shall be rigid in construction, cheap to manufacture, in which means will be provided for preventing the cocking of the spring, and in which new and improved means are provided for permitting the adjustment of the tension of the spring.

A preferred embodiment of the invention is illustrated in the drawings, in which:

Figure 1 is a detached view of a sill of the chassis and the spring of an automobile, with the shock absorber attached thereto;

Figure 2 is a side view of the device with the cover plate removed; and

Figure 3 is a section on the line 3—3 of Figure 2.

Referring to the drawings, in which like characters of reference denote like parts in the several figures, 10 indicates a sill of the chassis of an automobile, to one end of which is pivotally secured one end of the spring 11. Secured to the spring 11 is the axle or axle housing 12. Secured to the sill 10 substantially directly above the axle 12 is the shock absorber of the present invention, indicated generally at 13. The strap 14 is secured at one end to the axle 12, and at its other end is adapted to be passed over a friction surface and wound about a spring-operated drum within the device 13, in a manner which will be presently described.

Referring now to Figure 3, 15 indicates the back plate of the absorber having an outwardly directed rib 16 extending partly about the device, as indicated in Figure 2. Secured to the rib 16, adjacent to one end thereof, by means of the screws 17, is an inwardly directed arm 18. The pivot pin 19 has one end received within a depression 20 in the back plate 15, the other end being reduced and received in an opening 21 in the inwardly directed arm 18. Mounted about the pin 19 is a hub 22 of a drum 23. The end member 24 of the drum is provided with a plurality of inwardly extending lugs 25. A coil spring 26 is positioned about the hub 22 and has one of its hooked ends engaged with one of the lugs 25 and its other hooked end in engagement with the inwardly extending finger 27 at the end of the arm 18. The spring 26 operates to normally force the drum 23 in a counter-clockwise direction, as viewed in Figure 2.

Positioned about one end of the pin 19, between the shouldered portion of the pin and the arm 18, is a cup-shaped member 28, the inwardly directed flange 29 of which extends within the end of the coil spring 26. The device 28—29 is provided to prevent the spring 26 from cocking when placed under tension and thus greatly reduces the liability of the spring breaking. The strap or belt 14 is secured at one end by means of the rivets or screws 30 to the drum 23. It then passes about the drum in a clockwise direction, as seen in Figure 2, and over the outer circumference of the flange 16 and then downwardly, as indicated in Figure 1, the free end thereof being secured to the axle or axle housing 12.

An oblong, basin-shaped housing plate 31 is provided for covering the device in order to exclude dust and dirt therefrom. The inwardly extending flange 32 of the plate 31 is arranged to snugly engage the outer circumference of the base member 15. The plate 31 is adapted to be secured in position by means of a screw 33 which passes therethrough and into threaded engagement with the arm 18 and flange 16. The flange 32 of the housing plate 31 is cut away, as indicated in Figure 1, to permit the passage therethrough of the belt or strap 14. The downwardly extending portion 34 of the web 16 snugly engages the inner surface of the flange 32 of the housing plate adjacent to the cut-away portion. The rib 16 adjacent to one end thereof is enlarged and provided with a transversely extending opening 35 through which may be passed a bolt 36 for securing the device to the automobile frame or sill. The device may be held against rotation by providing on the back thereof about the opening 35, a boss 37 provided with a slot 38 adapted to receive a rib on the sill member 10.

In installing the device, the shock absorber is clamped to the sill member 10 by means of the bolt 36, as above described. The belt 14 is then drawn out of the casing, thus rotating the drum 23 until the positioning rivet 39 appears at the edge of the opening. It should be here explained that the rivet 39 at the time the device is made is placed at the proper point in the belt. The downwardly extending portion of the belt 14 is then drawn taut and attached to the axle 12.

It is desirable to vary the tension of the spring 26 to accommodate vehicle springs of different strengths such as are provided on cars of different weights. The tension of the spring may be adjusted by removing the screws 17 which hold the arm 18 in position, moving the arm with the spring 26 outwardly and positioning the hook at one end of the spring 26 in engagement with whichever one of the lugs 25 will give the desired tension. The arm 18 is then again secured in position. Regardless of the tension in the spring 26, the belt 14 should always be adjusted when applied to the vehicle, with the marker or rivet 39 at the edge of the opening in the absorber, as previously described.

In operation, upon the movement of the axle 12 toward the sill member 10, the belt 14 is slackened and the slack is taken up by the rotation of the drum in a counter-clockwise direction, as view in Figures 1 and 2 under the influence of the spring 26. Upon the action of the spring 11 to move the axle 12 away from the frame member 10, the belt 14 frictionally engages the upper surface of the flange 16 and acts to retard this movement, thus causing the parts gently to return to their normal positions.

As the action of shock absorbers of this general character is well known, it is believed that further description of the operation is unnecessary.

Having thus described my invention, what I claim is new and desire to secure by Letters Patent of the United States is:

1. In a shock absorber, a casing including a friction track, a drum having a hub rotatably mounted in said casing, a plurality of inwardly extending lugs on said drum, an arm having one end secured to said casing, and the other to the pivotal support for said hub, an inwardly extending finger on the end of said arm, a coiled spring surrounding said hub having its opposite ends secured respectively to said finger and a desired one of said lugs, and a belt secured at one of its ends to said drum, the opposite end of said belt extending over the friction track and external to said casing.

2. In a shock absorber, a casing including a friction track, a drum, a hub within said drum, a web joining said drum to said hub, a plurality of lugs on said web, means within said casing for rotatably supporting said hub, an arm having one end secured to said casing and the other to said supporting means, the end of said arm being turned inwardly to form a finger, a coiled spring surrounding said hub having its opposite ends secured respectively to said finger, and a desired one of said lugs, and a belt secured at one of its ends to said drum, the opposite end thereof extending over the friction track and external to said casing.

3. In a shock absorber, a casing including a friction track, a drum, a drum hub, a web joining said drum to said hub, a plurality of lugs on said web, a shaft extending through said hub and having one end supported in said casing, an arm having one end secured to said casing, a reduced extension on the end of said shaft forming a shoulder, a cup-shaped member on said reduced extension and abutting said shoulder, said reduced extension passing through said arm and being riveted thereto, an inwardly bent finger on said arm, a coiled spring surrounding said hub and having one end extending over said cup-shaped member, one extremity of said spring being secured to said finger and the other extremity to a desired lug on said web, and a belt secured at one of its ends to said drum, the opposite end thereof extending over the friction track and external to said casing.

4. In a shock absorber, a casing including a friction track, a drum having a hub rotatably mounted in said casing, an arm having one end secured to said casing and the other to the pivotal support for said drum, a coiled spring surrounding said hub having its opposite ends secured respectively to said drum and said arm, a cylindrical member separate from said hub and extending within the end of said spring adjacent to said arm, and a belt secured at one of its ends to said drum, the opposite end thereof extending over the friction track and external to said casing.

5. In a shock absorber, a casing including a friction track, a drum, a hub within said drum, a web joining said drum to said hub, a plurality of lugs on said web, means within said casing for rotatably supporting said hub, an arm having one end secured to said casing and the other to said supporting means, a coiled spring surrounding said hub having its opposite ends secured respectively to one of said lugs and said arm, a shaft extending through said hub, a shoulder on said shaft, a cup shaped member carried by said shaft against said shoulder and extending within the end of said spring adjacent to said arm, and a belt secured at one of its ends to said drum, the opposite end thereof extending over the friction track and external to said casing.

6. In a shock absorber of the class described, the combination of a casing, a friction track in said casing, a spring drum in said casing, a belt passing over said friction track and connected to said spring drum, a bolt hole in said casing, said casing being adapted to be mounted on the automobile frame through a single bolt passing through said bolt hole, said casing having a slot therein adjacent said bolt hole for receiving a cooperating rib on the automobile frame to prevent said casing from turning.

7. In a shock absorber, a casing having an outlet opening, a belt entering said casing through said outlet opening, shock absorber means in said casing for retarding the outward pull of said belt, and a marker on said belt to indicate the extent of belt to be initially withdrawn from said casing in installing the device.

In witness whereof, I hereunto subscribe my name this 4 day of November, 1922.

HARRY CROSS.

Witnesses:
  GEO. W. MOORE,
  BYRON D. CHEASBRO.